United States Patent Office 3,641,019
Patented Feb. 8, 1972

3,641,019
THIAZOLO-as-TRIAZINES
Donald L. Trepanier and Paul E. Krieger, Indianapolis, Ind., assignors to The Dow Chemical Company, Midland, Mich.
No Drawing. Filed Aug. 30, 1968, Ser. No. 756,411
Int. Cl. C07d 91/42
U.S. Cl. 260—248 AS    6 Claims

ABSTRACT OF THE DISCLOSURE

Substituted thiazolo[3,2-b] or [2,3-c]-as-triazines and their methohalides and pharmaceutically-acceptable salts such as 3,4-dihydro-6-phenyl-2,4-dimethyl-2H-thiazolo-[2,3-c]-as-triazine hydrobromide are prepared by the reaction of a substituted tetrahydro-as-triazine-3(2H)-thione with a 1,2-disubstituted ethane such as 1,2-dibromoethane or a 1-nitriol-2-phenyl-2-toluenesulfonyloxyethane. The novel compounds have pharmacological activity, notably as antidepressants as indicated by their antagonism of reserpine and their potentiation of amphetamine, and they are also useful in potentiation of barbiturates.

CROSS-REFERENCES TO RELATED APPLICATIONS

The substituted tetrahydro - as-triazine-3(2H)-thione compounds employed as starting materials herein are disclosed and claimed in a copending application by Paul E. Krieger entitled "Tetrahydro - as - Triazine - 3(2H)-Thiones," Ser. No. 756,412, filed concurrently herewith and hereby incorporated by reference.

The copending application teaches that the substituted tetrahydro-as-triazine-3(2H)thiones are prepared by the reaction of a substituted 2-aminoalkyl-hydrazine with carbon disulfide in an alcoholic reaction medium. The copending application also teaches the preparation of substituted 2-aminoalkylhydrazines by the reaction of a substituted aziridine with a substituted hydrazine as taught by Trepanier et al., Journal of Medicinal Chemistry, 10, 228 (1967).

SUMMARY OF THE INVENTION

This invention is concerned with novel substituted thiazolotriazines and is particularly directed to substituted thiazolo-as-triazine compounds corresponding to one of the formulae:

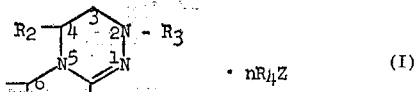

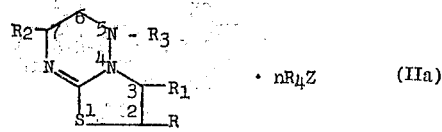

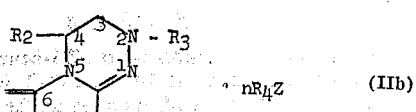

In the present specification and claims, B represents a double bond (=) of a 6,7-vinylene linkage in a 3,4-dihydro-2H-thiazolo[2,3-c]-as-triazine or a single bond (—) of a 6,7-ethylene linkage in a 3,4,6,7-tetrahydro-2H-thiazolo[2,3-c]-as-triazine; R and $R_1$ each independently represent hydrogen, indolylmethyl, phenyl, benzyl, substituted phenyl, substituted benzyl, methyl, ethyl, propyl or butyl; R' represents R, indolylhydroxymethyl, α-hydroxybenzyl or α-hydroxy-substituted-benzyl; R" represents hydrogen or R' and R", taken together, represent indolymethylene, benzylidene or substituted benzylidene; $R_2$ and $R_3$ each independently represent hydrogen, methyl, ethyl or propyl; $n$ represents one of the integers zero or one and R4Z represents methobromide, methoiodide or the acid moiety of a pharmaceutically-acceptable acid addition salt.

The term "substituted phenyl," "substituted benzyl" (including α-hydroxy-substituted-benzyl) and "substituted benzylidene," as employed in the present specification and claims, mean and refer, respectively, to phenyl, benzyl or benzylidene moieties substituted with from one, to two, to three substituents selected from fluorine, chlorine, bromide and loweralkyl and loweralkoxy of from one, to two, to three carbon atoms and which can also be substituted with a single additional substituent selected from amino, aminoloweralkylamino, loweralkylamino and diloweralkylamino in which loweralkyl contains from 1, to 2, to 3 carbon atoms. The terms thus include, for example, phenyl, benzyl, benzylidene; amino- phenyl, benzyl or benzylidene; aminoloweralkylamino-phenyl, benzyl or benzylidene; and loweralkylamino- or diloweralkylamino-phenyl, benzyl or benzylidene moieties substituted with from 1, to 2, to 3 or fluorine, chlorine, bromine and loweralkyl and loweralkoxy of from 1, to 2, to 3 carbon atoms. The term "pharmaceutically-acceptable salt," as herein employed, refers to non-toxic salts of the thiazolotriazine compounds. The term includes the salts of the thiazolotriazine compounds with acidic or anionic moieties which have no substantial toxicity or detrimental pharmacological effect when such a thiazolotriazine salt is administered to animals at dosages consistent with good pharmacological activity. Such pharmaceutically-acceptable salts include non-toxic acid addition salts with inorganic acids such as the hydrochloride, hydrobromide, hydroiodide, sulfate, nitrate, bisulfate or phosphate salts, or salts formed with organic acids such as the acetate, propionate, succinate, malate, fumarate, glutamate, salicylate, maleate, tartrate or citrate salts, or salts with organic sulfonic acids such as the camphorsulfonate, methanesulfonate, benzenesulfonate or toluenesulfonate salts. The hydrohalide salts are particularly useful in the preparation, purification and use of the thiazolotriazines of the invention and are the preferred pharmaceutically-acceptable salts. The term "halide," as employed in the present specification and claims with respect to the salts of the thiazolotriazine compounds, refers to chloride, bromide and iodide.

The thiazolotriazine compounds corresponding to Formula I are 5H-thiazolo[3,2-b]-as-triazines and those corresponding to Formulae IIa and IIb are 2H-thiazolo-[2,3-c]-as-triazines. The bracketed numerals and letters indicate the atoms and bonds involved in both the thiazole ring and the triazine ring of the fused thiazolotriazine. For the sake of convenience, the compounds of Formulae I, IIa and IIb will be hereinafter referred to as "thiazolotriazines," while those of Formula I alone will be referred to as "thiazolo[3,2-b]-triazines" and those for Formulae IIa and IIb will be referred to as "thiazolo[2,3-c]-triazines." The position of substituents on the thiazolotriazine compounds will be indicated by naming the compounds in accordance with the numbering set out in the above formulae. For example, in the thiazolo[3,2-b]triazines of Formula I, R, $R_1$, $R_2$ and $R_3$ are substituents in the 2, 3, 7 and 5 positions, respectively, while in the thiazolo[2,3-c]triazines of Formula IIa, they are substituents in the 7, 6, 4 and 2 positions, respectively.

The novel thiazolotriazine compounds are high boiling liquids or crystalline solids which are, in general, slightly soluble in water and of varying degrees of solubility in organic liquids such as lower alcohols, halogenated hydrocarbons, aliphatic hydrocarbons, acetone, benzene, ether and the like. In general the compounds wherein $n$ is one are somewhat more soluble in water and lower alcohols and less soluble in organic liquids such as benzene and ether than are the compounds wherein $n$ is zero.

The thiazolotriazines of the invention are useful for administration to animals in the study of the behavior thereof and in the investigation of drug effects on the central and peripheral nervous systems. They are particularly useful as antidepressants as indicated by their potentiation of amphetamine and their antagonism of reserpine. They also can be employed to potentiate the effects of barbiturates. Certain of the compounds corresponding to Formula IIa and IIb also are useful as anticonvulsants and skeletal muscle relaxants. For such uses, it is generally preferable to employ the compounds in the form of the free base or a hydrohalide salt, that is, a compound wherein $R_4Z$ is hydrogen halide. A preferred group of compounds is the thiazolo[2,3-c]triazines of Formulae IIa and IIb. Of the thiazolo[2,3-c]triazines, those wherein $R_2$ is hydrogen and $R_3$ is methyl or hydrogen are particularly preferred. A preferred group of compounds includes the compounds of Formulae IIa and IIb wherein B represents a double bond or vinylene linkage, $n$ is zero, $R_2$ and $R_3$ are hydrogen or methyl and the substituted phenyl, substituted benzyl or substituted benzylidene moieties are substituted with 1 to 3 substituents selected from chlorine, bromine and methoxy. An additional preferred group of compounds includes those corresponding to Formula IIb wherein $R_2$ is hydrogen, $R_3$ is hydrogen or methyl and $R_4Z$ is hydrogen halide, the compounds of this group having little or no toxic properties even when employed in dosages many times greater than required to achieve a particular pharmacological response. In addition to the hydrohalide salts, other pharmaceutically-acceptable salts, and particularly the benzenesulfonate and the tosylate (p-toluenesulfonate) salts, can also be employed in the preparation and purification of the thiazolotriazines and such salts can be administered to animals or can be converted to the free base or to the hydrohalide salts.

The thiazolotriazines of the invention are prepared by a process comprising the reaction of a tetrahydro-as-triazine-3(2H)thione corresponding to Formula III

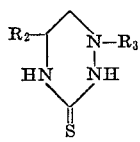

(III)

wherein $R_2$ and $R_3$ have the significance set out above with respect to Formulae I, IIa and IIb, with a 1,2-disubstituted ethane. For the sake of convenience, the compounds corresponding to Formula III will be hereinafter referred to simply as "triazinethiones."

In the present specification and claims, the term "1,2-disubstituted ethane" means and refers to one or more 1,2-disubstituted ethane selected from:

(a) 1-halo-2-ketoethanes corresponding to Formula IV

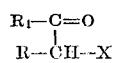

(IV)

(b) 1-halo-2,2-dialkoxyethanes corresponding to Formula V

(c) 1-halo-2-nitriloethanes corresponding to Formula VI

(d) 1-sulfonyloxy-2-nitriloethanes corresponding to Formula VII

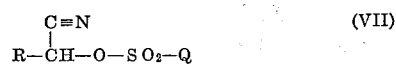

(e) 1-halo-2-keto-2-alkoxyethanes corresponding to Formula VIII

(f) 1,2-dihalo-2-ketoethanes corresponding to Formula IX

(g) 1,2-dihaloethanes corresponding to Formula X

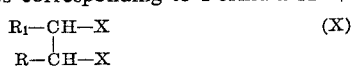

(h) 1-halo-2-sulfonyloxyethanes corresponding to Formula XI

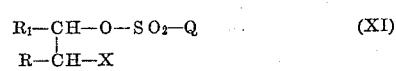

(i) 1-halo-2-hydroxyethanes corresponding to Formula XII

In the above Formulae IV through XII, R and $R_1$ have the significance set out above with respect to Formulae I, IIa and IIb; Q represents phenyl, benzyl, tolyl or xylyl or alkyl of from 1 to 6 carbon atoms, inclusive; A represents alkoxy of 1, to 2, to 3, to 4 carbon atoms, inclusive; and X represents chlorine, bromine or iodine. When X appears twice in a single compound, namely, in the 1,2-dihaloethanes of Formula X and the 1,2-dihalo-2-ketoethanes of Formula IX, each X independently represents chlorine, bromine or iodine. In the present specification and claims, the 1,2-disubstituted ethanes will be named as substituted ethanes, rather than as α-haloacetaldehydes, α-haloacetaldehyde dialkyl acetals, α-halo- or α-sulfonyloxyacetonitriles, alkyl esters of α-haloacetic acid, α-haloacetyl halides or α-haloethanols, for example. Representative 1,2-disubstituted ethanes include 1,2-dichloroethane,
1-chloro-2-bromoethane,
1,2-dibromoethane,
1,2-diiodoethane,
1-ethyl-1,2-dibromoethane,
1,2-dichloro-1,2-di(3,4-dichlorophenyl)-ethane,
1-chloro-2-keto-1-phenyl-2-benzylethane,
1-benzenesulfonyloxy-1-(2,4,5-trichlorophenyl)-2-nitriloethane,
1-(indol-3-ylmethyl)-1-methanesulfonyloxy-2-nitriloethane,
1-(2,4-dimethoxybenzyl)-1-n-hexylsulfonyloxy-2-nitriloethane,
1-iodo-1,2-di(4-propylphenyl)-2,2-dibutoxyethane,
1,2-dibromo-1-butyl-2-propylethane,
1,2-dibromo-1-(4-fluorophenyl)-2-ketoethane,
1-bromo-1-(4-ethoxyphenyl)-2-(4-methoxyphenyl)-2-p-toluenesulfonyloxyethane, 1-bromo-2-keto-1-methylethane,
1-chloro-1-(4-fluorobenzyl)-2-keto-2-methoxyethane,
1-bromo-2-keto-2-(4-dimethylaminophenyl)ethane,
1-chloro-2,2-diethoxy-1-phenyl-2-propylethane,
1-iodo-2-hydroxy-2-(3,4-diethylphenyl)ethane,
1,2-dibromo-1-(2,6-dichloro-4-aminophenyl)ethane,
1-bromo-2-nitrilo-1-(2,3,5-tribromo-4-dimethylamino)ethane,
1-chloro-1-[4-(2-aminoethylamino)benzyl]-2,2-dimethoxyethane,
1-bromo-1-(2,4,6-trimethyl-3-aminophenyl)-2-keto-2-propoxyethane,
1-bromo-1,2-di[4-(3-aminopropylamino)phenyl]-2-ketoethane,
1-iodo-1-(3-fluorophenyl)-2-(4-chlorophenyl)-2-benzenesulfonyloxyethane,
1-iodo-1-[4-(N-methyl-N-ethylamino)phenyl]-2-nitriloethane,
1-bromo-2,2-dipropoxyethane,
1,2-dibenzyl-1,2-dibromoethane,
1-chloro-1-benzyl-2-keto-2-methoxyethane,
1-bromo-2-chloro-1-phenylethane,
1-bromo-1-(4-aminomethylaminobenzyl)-2-nitriloethane and
1-bromo-2-chloro-2-keto-1-phenylethane.

The reaction proceeds when the reactants are contacted and mixed, preferably in an inert organic liquid reaction medium. Representative inert organic liquids which can be employed as reaction media include lower-alkanols of 1 to 4 carbon atoms, acetone, glycols of the ethylene, propylene and trimethylene series, dimethylformamide, dimethylsulfoxide and methylene chloride.

The preferred inert organic liquids to be employed as reaction media are methanol, ethanol and mixtures thereof. The reaction proceeds at temperatures of 25° to 125° C. and is preferably carried out at the boiling point of the reaction mixture under reflux. The exact proportion of the reactants to be employed is not critical, some of the desired thiazolotriazine product being obtained when the reactants are employed in any proportions; however, the reaction consumes the 1,2-disubstituted ethane and the tetrahydro-as-triazine-3(2H)thione in equimolar proportions and the reactants are preferably employed in such proportions. The reaction is generally complete in from about 1 to about 100 hours depending upon the reaction temperature employed. The product can be separated from the reaction mixture by conventional procedures such as evaporation, filtration or distillation. The product can be purified by further conventional procedures including extraction, washing, chromatography, distillation or recrystallization.

Whether or not the thiazolotriazine product is a thiazolo[3,2-b]triazine of Formula I or a thiazolo[2,3-c]triazine of Formulae IIa or IIb depends on the particular 1,2-disubstituted ethane employed.

The 1,2-dihaloethane, 1-halo-2-sulfonyloxyethane and 1-halo-2-hydroxyethane starting materials react with the triazinethione starting materials to form 2,3,6,7 - tetrahydro - 5H-thiazolo[3,2-b]-as-triazines corresponding to Formula I. Thus, in the preparation of the compounds corresponding to Formula I by the reaction with a triazinethione, it is essential that a 1,2-dihaloethane starting material corresponding to Formula X, a 1-halo-2-sulfonyloxyethane corresponding to Formula XI or a 1-halo-2-hydroxyethane corresponding to Formula XII be employed. In a convenient procedure, the starting material is a 1,2-dihaloethane wherein both substituents X are the same halogen and the 1,2-dibromoethane compounds are preferred. When the desired product is a thiazolotriazine corresponding to Formula I wherein both R and $R_1$ are the same, or when R is hydrogen while $R_1$ is phenyl, benzyl, substituted benzyl, substituted phenyl or indolylmethyl, then a corresponding 1,2-dihaloethane of Formula X is a preferred starting material. When the desired product corresponds to Formula I wherein R and $R_1$ are different, and particularly when R and $R_1$ are phenyl or substituted phenyl (for example, in 5,7-dimethyl-2 - (3,4 - dimethylphenyl) - 3-(4-fluorophenyl)-3,4,6,7 - tetrahydro - 5H - thiazolo[3,2-b]-as-triazine), the reaction of a 1,2-dihaloethane of Formula X with a triazinethione can result in the formation of a mixture of two isomeric thiazolo[3,2-b]triazine products, in one of which the substituents desired in the 2 and 3 positions are substituted in the 3 and 2 positions, respectively (for example, the above-named compound can be mixed with 5,7-dimethyl-3-(3,4 - dimethylphenyl) - 2-(4-fluorophenyl) - 3,4,6,7 - tetrahydro - 5H - thiazolo[3,2-b]-as-triazine). Such mixtures can be employed directly and without separation of the isomers in pharmacological operations, or they can be separated by such conventional techniques as fractional crystallization or chromatography. The reaction of a 1-halo-2-sulfonyloxyethane of Formula XI with a triazinethione generally yields a single triazinethione product, whether R and $R_1$ are identical or not. When neither R nor $R_1$ are alkyl or hydrogen, R and $R_1$ being different, the 1,2-disubstituted ethane or Formula XI is a preferred starting material.

The 1,2-disubstituted ethanes corresponding to Formulae IV through IX, inclusive, react with the triazinethione starting material to form 3,4 - dihydrothiazolo-[2,3-c]triazines corresponding to one of Formula IIb wherein R' is R and R'' is hydrogen, or IIa wherein B is a vinylene linkage. In such reaction, thiazolotriazines of Formula IIa wherein B is a vinylene linkage are prepared when the 1,2-disubstituted ethane corresponds to one of Formulae IV and V. Compounds of Formula IIb wherein R' is R and R'' is hydrogen are prepared by employing 1,2-disubstituted ethanes of one of Formulae VI, VII, VIII or IX. Thus, in the preparation of thiazolo[2,3-c]triazines by the method of the invention, it is essential that the 1,2-disubstituted ethane employed corresponds to one of Formulae IV, V, VI, VII, VIII or IX. When it is desired to produce a thiazolo[2,3-c]triazine of Formula IIa wherein B is a vinylene linkage and R and $R_1$ are hydrogen, phenyl or substituted phenyl, a preferred starting material is a compound corresponding to one of Formulae IV and V, preferably a compound wherein X is bromine or chlorine. When the desired product corresponds to Formula IIb wherein R'' is hydrogen, a preferred starting material is a 1,2-disubstituted ethane corresponding to one of the Formulae VI, VII and VIII wherein Q is tolyl or phenyl and X is bromine or chlorine.

In a convenient procedure for the preparation of the thiazolotriazines corresponding to Formulae I, IIa wherein B is a vinylene linkage and IIb wherein R' is R and R'' is hydrogen, a triazinethione and a 1,2-disubstituted ethane corresponding to one of Formulae IV, V, X or XI or Formulae VI, VII, VIII or IX and an inert organic liquid are mixed together in any order or fashion. In a preferred procedure, the triazinethione is dissolved or suspended in methanol or ethanol and a mixture of methanol or ethanol with the 1,2-disubstituted ethane is added thereto. The resulting mixture is then heated at a temperature within the reaction temperature range of from 1 to 100 hours. The mixture is cooled and evaporated until the thiazolotriazine salt product separates from the reaction medium. The salt product can be separated by evaporation of any remaining solvent or by filtration or decantation, and purified by recrystallization. In a convenient procedure for obtaining the free base, the salt product need not be separated, but the reaction mixture is concentrated and mixed with chloroform and an aqueous base such as aqueous sodium carbonate or aqueous sodium hydroxide. The free base product is conveniently separated from the mixture by separation of the organic, chloroform phase. The product can be obtained from the organic phase by evaporation of the chloroform solvent and can be purified by conventional procedures such as chromatography, preferably on an alumina column, recrystallization, distillation or washing. Alternately, the product can be converted to methobromide, methiodide or to a pharmaceutically-acceptable salt.

When the 1,2-disubstituted ethane is a substituted haloethane or dihaloethane or Formula IV, V, VI, VIII, IX or X, the thiazolotriazine product is typically formed in the reaction mixture as a hydrohalide salt corresponding to the halogen or halogens of the 1,2-disubstituted ethane reactant, or as a mixture of hydrohalide and sulfonate salts when the compound corresponds to Formula XI. When the 1,2-disubstituted ethane is a 1-nitrilo-2-sulfonyloxyethane of Formula VII, the product is formed in the reaction mixture as a sulfonate salt corresponding to the starting material. In such cases when it is desired to obtain the free base thiazolotriazine compound, it is convenient to neutralize the salt by adding a base such as aqueous potassium hydroxide, aqueous sodium hydroxide, potassium carbonate, sodium bicarbonate or aqueous sodium carbonate or the like to the reaction mixture in order to make the mixture strongly basic. The product can then be separated by extraction with a halogenated hydrocarbon solvent such as methylene chloride or chloroform. The product can then be obtained as the free base by evaporation of the solvent, or the extract can be further purified by chromatography. When it is desired to obtain the product as the hydrohalide or sulfonate salt, the reaction mixture is conveniently cooled and the reaction medium evaporated until the salt product precipitates from the mixture. The salt is then separated by filtration, centrifugation, decantation or the like, or it can be neutralized with an alkali metal hydroxide or alkali metal carbonate or bicarbonate to prepare the free base thiazolotriazine. Whether obtained as a salt or as a free base, the product can be purified by methods such as chromatography, washing or recrystallization from organic solvents such as ethyl acetate, ether, pentane, chloroform or the like.

The reaction of the triazinethione with the 1,2-disubstituted ethane in an inert organic liquid provides excellent yields of thiazolotriazine product in most cases without the need for additional reactants, catalysts or further reaction steps. When the 1,2-disubstituted ethane corresponds to Formula X, however, improved results can be obtained by carrying out the reaction in the presence of a hydrogen halide acceptor. When the 1,2-disubstituted ethane corresponds to Formula V, the reaction is carried out in the presence of an acid. When the 1,2-disubstituted ethane corresponds to Formula XII, additional reaction steps are generally required to obtain a thiazolotriazine product.

The reaction of a triazinethione starting material with a 1,2-dihaloethane corresponding to Formula X proceeds with the production of two molar proportions of hydrogen halide for each molar proportion of 1,2-dihaloethane consumed in the reaction, and in certain cases, with the production of a substituted ethylenedithiobis-as-triazine together with the thiazolo[3,2-b]triazine product. It is preferred to carry out the reaction in the presence of a hydrogen halide acceptor such as an alkali metal hydroxide, alkali metal carbonate or bicarbonate or an organic base such as pyridine or triethylamine. In such procedure, the hydrogen chloride acceptor is preferably employed in an amount of at least one equivalent of hydrogen halide acceptor for each atomic proportion of halogen in the 1,2-dihaloethane. For example, when one mole of 1,2-dihaloethane is employed, it is preferred to employ one mole of sodium carbonate, or two moles of pyridine or lithium hydroxide. The hydrogen halide acceptor is preferably mixed with one of the reactants prior to the contacting with the other reactant, or in any event, prior to heating the reaction mixture to elevated temperatures. Such procedure substantially increases the yields of the thiazolo[3,2-b]triazine product which is obtained as the free base and decreases the amount of substituted ethylenedithiobis-as-triazine.

When the 1,2-disubstituted ethane is a 1-halo-2,2-dialkoxyethane corresponding to Formula V, the reaction of the 1-halo-2,2-dialkoxyethane with the triazinethione is carried out in the presence of a catalytic amount of an acid. Any acid which is not detrimentally reactive with the reactants or the product can be employed, sulfuric acid, acetic acid and hydrobromic acid all being suitable, and hydrochloric acid. The acid is employed in a catalytic amount, that is, that amount sufficient to improve the rate or yield of the reaction under given conditions of temperature, pressure, mole concentration of reactants and the like. A catalytic amount of from about 0.05 to about 1 mole of acid per mole of the least abundant reactant generally provides excellent results.

When the 1,2-disubstituted ethane employed in the above procedure is a 1-halo-2-hydroxyethane corresponding to Formula XII, the production of a thiazolotriazine product will generally require the additional steps of contacting the product successively with a thionyl halide and a hydrogen halide acceptor. The reaction of the 1-halo-2-hydroxyethane with the triazinethione generally proceeds with the production of a substituted 1,4,5,6-tetrahydro-3-(2-hydroxyethylthio)-as-triazine intermediate compound corresponding to the formula

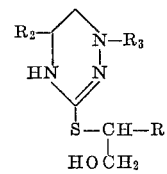

(XIII)

wherein R, $R_2$ and $R_3$ have the significance set out above. The intermediate compound can be cyclized to prepare a thiazolo[3,2-b]triazine corresponding to Formula I by reacting the intermediate with a thionyl halide such as thionyl chloride or thionyl bromide to prepare the corresponding 1,4,5,6-tetrahydro-3-(2-haloethylthio)-as-triazine, followed by the base-catalyzed dehydrohalogenation of the 3-(2-haloethylthio)-as-triazine intermediate to produce the thiazolo[3,2-b]triazine product.

In a convenient procedure, the 1-halo-2-hydroxyethane of Formula XII and the triazinethione are reacted together and the triazine intermediate is separated as the reaction product in the procedures described above. The substituted 1,4,5,6-tetrahydro-3-(2-hydroxyethylthio)-as-triazine intermediate is mixed with a thionyl halide, preferably in the presence of an inert organic solvent such as chloroform or methylene chloride, or in excess thionyl halide as reaction medium. The reaction proceeds readily at temperatures of from 25° to 90° C. with the production of the desired triazine intermediate and sulfur dioxide of reaction. The proportions of the reactants to be employed are not critical; however, the use of excess thionyl halide is preferred. The resulting substituted 1,4,5,6-tetrahydro-3-(2-haloethylthio)-as-triazine hydrohalide is separated by conventional procedures such as evaporation of solvent and excess thionyl halide followed by washing the evaporation residue with ether. The compound is then mixed with a hydrogen halide acceptor such as pyridine, sodium hydroxide, triethylamine, potassium hydroxide, sodium carbonate, potassium carbonate or the like. The hydrogen halide acceptor is preferably employed in excess, usually in the proportions of about 3 moles of hydrogen halide acceptor to every mole of triazine compound. The dehydrohalogenation reaction is carried out in the presence of an inert solvent such as water, methanol, ethanol, dimethylformamide, dimethylsulfoxide or mixtures thereof, and preferably at the boiling temperature of the reaction mixture under reflux. Good yields are obtained with heating periods from about 1 to 30 minutes. The thiazolo[3,2-b]triazine product can then be separated by such conventional procedures as extraction, chromatography or the like.

While the above-described procedures can be employed to prepare certain thiazolotriazines corresponding to Formula IIb, when R' represents α-hydroxybenzyl, α-hydroxy-substituted-benzyl or indolylhydroxymethyl, or R' and R", taken together, represent benzylidene, substituted benzylidene or indolylmethylene, these compounds are prepared by the reaction of a substituted triazinethione corresponding to Formula III with a 1,2-disubstituted ethane corresponding to one of Formula VI, VII, VIII or IX wherein R is hydrogen, followed by the reaction of the resulting thiazolotriazine product with an aldehyde selected from benzaldehyde; substituted benzaldehydes containing from 1, to 2, to 3 substituents selected from fluorine, chlorine, bromine, loweralkyl and loweralkoxy of from 1, to 2, to 3 carbon atoms, and zero or one substituent selected from amino, aminoloweralkylamino, loweralkylamino and diloweralkylamino in which loweralkyl contains from 1, to 2, to 3 carbon atoms and indolecarboxaldehyde. Representative aldehydes which can be employed include indole-3-carboxaldehyde,
4-methylbenzaldehyde,
2-chloro-4-aminobenzaldehyde,
2,4-dibromobenzaldehyde,
4-fluorobenzaldehyde,
indole-6-carboxaldehyde,
2,4,6-trichlorobenzaldehyde,
2,4,5-trimethylbenzaldehyde,
2,6-dimethyl-4-chlorobenzaldehyde,
2-chloro-6-bromo-4-methylaminobenzaldehyde,
indole-2-carboxaldehyde,
2,5-dibromobenzaldehyde,
3-chloro-5-fluorobenzaldehyde,
indole-4-carboxaldehyde,
2,4-dimethoxybenzaldehyde,
2-fluoro-4-ethoxybenzaldehyde,
2-methyl-4-isopropylbenzaldehyde,
3,4,5-trimethoxybenzaldehyde,
4-ethylbenzaldehyde,
4-propoxybenzaldehyde,
4-aminomethylaminobenzaldehyde,
4-(N-propyl-N-methylamino)benzaldehyde and
benzaldehyde.

The reaction of the thiazolotriazine with the aldehyde proceeds with the production of the α-hydroxybenzyl, α-hydroxy-substituted-benzyl or indolylhydroxymethyl substituted thiazolotriazine and the subsequent dehydration of the hydroxy-containing compound to form the corresponding benzylidene, substituted benzylidene or indolylmethylene substituted thiazolotriazine product. The above-named hydroxy-containing compounds are thus useful as intermediates in the preparation of the unsaturated compounds. The reaction of the aldehyde with the thiazolotriazine takes place when the reactants are contacted and mixed in an inert organic liquid as a reaction medium and in the presence of a catalytic amount of piperidine. Representative inert organic liquids which can be employed as reaction media include methanol, ethanol and isopropanol. The reaction proceeds at temperatures of 25° to 125° C. and is preferably carried out at the boiling point of the reaction mixture under reflux. The exact proportion of the reactants to be employed is not critical; however, the thiazolotriazine and the aldehyde are consumed in equimolar proportions during the reaction, and the reactants are preferably employed in such proportions. The reaction is generally complete in about 4 to 24 hours depending upon the reaction temperature employed, with the production of a thiazolotriazine wherein R and R' together represent an unsaturated substituent as the sole product. The α-hydroxybenzyl and α-hydroxy-substituted-benzyl substituted thiazolotriazines are relatively stable and are conveniently isolated in admixture with the corresponding benzylidene thiazolotriazine product by employing lower reaction temperatures of from 25° to 75° C. for short periods of time such as from 5 minutes to 2 hours. The exact mixture of products obtained is dependent on reaction temperature and time, longer reaction times and higher temperatures tending to produce a greater proportion of the unsaturated products. When it is desired to obtain the compounds wherein R is α-hydroxybenzyl or α-hydroxy-substituted-benzyl, such compounds can be separated from the reaction mixture by conventional procedures such as evaporation or distillation. The mixture of products can then be separated by fractional distillation under reduced pressure or by chromatography; the preferred method of separation is chromatography on a column containing alumina and employing chloroform as an eluant. The products can be purified by conventional procedures such as recrystallization, or they can be converted to the methobromides or methoiodides or pharmaceutically-acceptable salts.

The compounds corresponding to Formula IIa wherein $R_1$ is hydrogen and B is a single bond can be prepared by the reduction of a compound corresponding to Formula IIb with a reducing agent such as diborane. The reduction reaction proceeds when the reactants are contacted and mixed, preferably in an inert organic liquid as a reaction medium. Representative inert organic solvents which can be employed as reaction media include tetrahydrofuran and ether. The reaction takes place at temperatures of from 10° to 100° C. and is preferably carried out at the boiling point of the reaction mixture under reflux. The reaction is generally complete in from two hours to three days. After the reaction period, the product can be separated by removing any excess reducing agent by the addition of alcohol, water, aqueous tetrahydrofuran or the like, acidifying the mixture with dilute aqueous mineral acid and washing with aqueous sodium chloride solution followed by basification with aqueous sodium hydroxide. The product is then separated by conventional procedures such as extraction of the product with an organic liquid and evaporation or distillation of the organic extract to remove the organic liquids. The product is conveniently purified by conventional procedures such as recrystallization or washing. The product can also be purified by converting it to a methobromide, methoiodide or a pharmaceutically-acceptable salt. The methohalide or the salt can then be purified by conventional procedures such as recrystallization and employed in pharmacological operations.

In a convenient procedure, a thiazolotriazine corresponding to Formula IIb is dispersed in an inert organic liquid such as tetrahydrofuran and the resulting solution is added slowly to a suspension of diborane in an inert organic liquid. The exact proportions of the reactants to be employed are not critical, some of the desired product being obtained when the reactants are employed in any proportions. However, in the preferred procedure, an excess of the reducing agent is employed. When the addition of the thiazolotriazine is complete, the reaction mixture is heated to a temperature within the reaction temperautre range for from two hours to three days. The addition is preferably carried out at temperatures of from −10° C. to 10° C. under a nitrogen atmosphere. At the end of the reaction period, excess unreacted reducing agent is decomposed by the addition of aqueous tetrahydrofuran followed successively by hydrochloric acid and aqueous sodium hydroxide solution. The basic mixture is then extracted with a halogenated hydrocarbon solvent such as chloroform and the organic extract is washed and evaporated in vacuo to obtain the product as a residue. The product can then be converted to a pharmaceutically-acceptable salt by dissolving the product in ether and treating the ether solution with excess acid. Alternatively, the free base can be employed directly for pharmaceutical applications.

The thiazolo[2,3-c]triazine compounds corresponding to Formula IIa can also be prepared by the cyclization of a 4-(substituted ethyl)-as-triazine-3(2H)-thione corresponding to Formula XIV

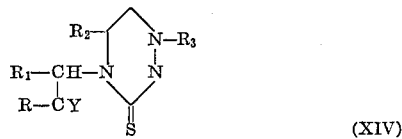

(XIV)

wherein CY represents hydroxymethylene (=CHOH), chloromethylene (=CHCl), bromomethylene (=CHBr) or diethoxymethylene (=C(OC$_2$H$_5$)$_2$), and R, R$_1$, R$_2$ and R$_3$ have the significance set out above. The compounds of Formula XIV can be prepared by the reaction of a 2-(2-substituted ethylamino)alkylhydrazine with carbon disulfide by procedures analogous to those of the concurrently-filed application of Paul E. Krieger, Ser. No. 756,412, referred to above. The hydrazine starting materials can be prepared by methods similar to those of Trepanier et al., J. Med. Chem., 10, 228 (1967).

In this procedure, the thiazolotriazines of Formula IIa wherein R is hydrogen and B is an ethylene linkage are prepared by the cyclization of a compound of Formula XIV wherein CY is a chloromethylene or bromomethylene in the presence of a hydrogen halide acceptor. The thiazolotriazines wherein B is a vinylene linkage are prepared by the cyclization of the compounds of Formula XIV wherein CY is diethoxymethylene in the presence of an acid medium such as concentrated sulfuric acid or polyphosphoric acid.

In preparing the thiazolotriazines by this procedure, a 4-(2-haloethyl)triazinethione corresponding to Formula XIV wherein CY is hydroxymethylene is reacted with a thionyl halide to prepare a compound wherein CY is chloromethylene or bromomethylene, which is then contacted with a hydrogen halide acceptor, preferably an alkali metal carbonate. The 4-(2-haloethyl)-triazinethione may be purified or may contain impurities. For example, when the 4-(2-haloethyl)triazinethione has been prepared by reacting a 4-(2-hydroxyethyl)triazinethione with a thionyl halide, excess unreacted thionyl halide may be present as an impurity. A starting material substantially free of thionyl halides is preferred. Representative hydrogen halide acceptors which can be employed include trimethylamine, pyridine, sodium carbonate, potassium carbonate, sodium hydroxide and potassium hydroxide, with sodium carbonate being preferable. In the preferred procedure, excess hydrogen halide acceptor is employed. The reaction is carried out in the presence of an inert solvent such as water, methanol, ethanol, dimethylformamide, dimethylsulfoxide or mixtures thereof. The reaction takes place readily at temperatures of from −10° to 50° C. and is preferably carried out at temperatures of 10° to 35° C. when the starting material contains a thionyl halide as an impurity. The reaction mixture is maintained at a temperature within the reaction temperature range for a short period of time, ranging from a few seconds to a few hours, after which it is diluted and cooled by the addition of water or base in aqueous solution. Good yields are obtained with reaction periods of from about 1 to 30 minutes. The 3,4,5,6-tetrahydro-2H-thiazolo-[2,3-c]triazine product can then be separated as the free base by such conventional procedures as extraction, distillation, evaporation, chromatography or the like. The product can be further purified or it can be converted to a pharmaceutically-acceptable salt or a methobromide or methoiodide.

The thiazolotriazines of Formula IIa wherein B is a vinylene linkage are conveniently prepared by dispersing a compound of Formula XIV wherein CY is diethoxymethylene in an acid medium, preferably concentrated sulfuric acid. The reaction proceeds when the triazinethione and acid are mixed at temperatures of from about −10° to about 30° C. and then heated at a temperature of from about 70° to 100° C. In contacting the 4-(2-substituted ethyl)triazinethione and the acid, the 4-(2-substituted ethyl)triazinethione is added slowly to the acid. The reaction is generally complete in from 1 to 36 hours. The product is conveniently separated by diluting the reaction mixture with crushed ice or cold water and extracting the dilute mixture with an organic solvent such as ether, chloroform, methylene chloride or the like, and washing the extract with aqueous base. Alternatively, the diluted reaction mixture can be made basic by the addition of aqueous base prior to extraction with an organic solvent. The product can be purified by conventional procedures.

The pharmaceutically-acceptable salts of the thiazolotriazines can be prepared by dissolving the free base of a thiazolotriazine in a solvent such as methanol, ethanol or ether and therafter adding an excess of a pharmaceutically-acceptable acid such as hydrogen chloride, acetic acid, hydrogen bromide, sulfuric acid, maleic acid, methanesulfonic acid, fumaric acid or hydrogen iodide until precipitation of the product is complete. The reaction proceeds at temperatures from 0° to 50° C. and is conveniently carried out at room temperature. The product can be separated by conventional procedures such as evaporation, filtration or centrifugation and purified by conventional procedures such as recrystallization and washing.

The free bases of the thiazolotriazines can be prepared from the salts by dissolving the salt in a minimal amount of methanol and making the solution strongly basic by the addition of an aqueous base such as sodium hydroxide, potassium hydroxide or sodium carbonate. The free base thiazolotriazine can be separated by conventional procedures such as extraction with a chlorinated hydrocarbon solvent. The free base can be purified by conventional procedures such as recrystallization or it can be converted to a different pharmaceutically-acceptable salt or to a methobromide or methoiodide.

In a convenient procedure for preparing the hydrohalides which are representative salts of the invention, a thiazolotriazine is dissolved in a minimal amount of methanol and an excess of ethereal hydrogen halide is added to the solution. The thiazolotriazine hydrohalide product is separated by filtration and the product can be purified by recrystallization from lower alcohols. Alternatively, the product can be treated with aqueous base to prepare free base thiazolotriazine.

The methoiodides and methobromides of the compounds of the invention are prepared by reacting methyl iodide or methyl bromide with a thiazolotriazine. The reaction is conveniently carried out in an inert organic liquid as a reaction medium and proceeds readily at temperatures of from 0° to 180° C. The proportions of the reactants to be employed are not critical, some of the desired products being obtained when combining the reactants in any proportion; however, the use of an excess of the methyl halide is preferred. The product can be separated by conventional procedures such as evaporation or filtration.

In carrying out the preparation of the thiazolotriazine methobromide and methoiodide compounds of the present invention, the reactants and the inert reaction medium are contacted together in any order or fashion. Suitable and representative inert organic liquid reaction media include acetone, methanol, ether and ethanol. During and/or after the contacting of the reactants, the reaction mixture is held at a temperature within the reaction temperature range for a period of time of from about one hour to several days. In a convenient procedure, the reaction mixture is held at a temperature of about 10° C. for about one week. In those cases in which the product precipitates in the reaction mixture as a solid material, it can be separated by such conventional procedures as filtration, decantation or centrifugation. In other operations, the reaction mixture may be fractionally distilled under reduced pressure to remove the low boiling constituents and obtain the product as a solid residue. The product separated as described above can be further purified by such conventional techniques as washing and recrystallization.

DESCRIPTION OF THE PREFERRED EMBODIMENTS

The following examples are illustrative of the invention and are not to be construed as limiting.

EXAMPLE 1

1,4,5,6-tetrahydro-1,5 - dimethyl - as - triazine - 3(2H) thione (7.6 grams; 0.053 mole), 1-bromo-2-keto-2-phenylethane (10.5 grams; 0.053 mole) and 50 milliliters of ethanol are mixed together, and the resulting mixture is heated at the boiling temperature under reflux for six hours. The mixture is evaporated under reduced pressure to obtain the product as a solid residue. The 3,4-dihydro-6-phenyl-2,4-dimethyl-2H - thiazolo[2,3 - c] - as - triazine hydrobromide product is recrystallized from a mixture of methanol and ether and found to melt at a temperature of 202°–203° C. The structure of the product is confirmed by infrared spectroscopy.

In substantially the same procedure, 1,4,5,6-tetrahydro-1-methyl-as-triazine-3(2H)thione and 1 - chloro - 2 - ketoethane are reacted together in ethanol to prepare 3,4-dihydro-2-methyl-2H-thiazolo[2,3-c]-as - triazine, boiling at 125°–130° C. under a pressure of 0.2 millimeter of mercury.

EXAMPLE 2

1-bromo-1,2-diphenyl-2-ketoethane (10 grams; 0.036 mole) is mixed together with 1,4,5,6-tetrahydro-1-methyl-as-triazine-3(2H)thione (4.5 grams; 0.036 mole) and 150 milliliters of ethanol. The mixture is heated at the boiling temperature under reflux for approximately eighteen hours. The product is separated as a residue after evaporation of the reaction mixture under reduced pressure. The 3,4 - dihydro - 2-methyl-6,7-diphenyl-2H-thiazolo[2,3-c]-as-triazine hydrobromide product is recrystallized from a mixture of methanol and ether and found to melt at a temperature of 244°–245° C. with decomposition.

In substantially the same procedure, the following thiazolotriazines are prepared.

3,4 - dihydro - 6-phenyl-7-benzyl-2H-thiazolo-[2,3-c]-as-triazine hydrochloride, having a molecular weight of 343, is prepared by the reaction of 1,4,5,6-tetrahydro-as-triazine - 3(2H)thione with 1-benzyl-1-chloro-2-keto-2-phenylethane.

3,4 - dihydro - 6-(4-fluorophenyl)-7-(2,6-dichloro-4-aminophenyl) - 2H-thiazolo[2,3-c]-as-triazine, having a molecular weight of 395, is prepared as the free base by reacting together 1,4,5,6 - tetrahydro-as-triazine-3(2H)thione and 1 - bromo-1-(2,6-dichloro-4-aminophenyl)-2-(4-fluorophenyl)-2-ketoethane in ethanol, evaporating the reaction mixture in vacuo and treating the evaporation residue with aqueous sodium carbonate to hydrolyze the hydrobromide salt and prepare the free base.

EXAMPLE 3

In substantially the same procedure as that employed in Examples 1 and 2, representative thiazolotriazine compounds are prepared by the reaction of a 1-halo-2-ketoethane with a triazinethione. The compounds, together with their melting points, are set out in the following table and identified by R, $R_1$, $R_2$, $R_3$, $n$ and $R_4Z$. The compounds all correspond to Formula IIa wherein B is a vinylene linkage.

| R | $R_1$ | $R_2$ | $R_3$ | $n$ | $R_4Z$ | Melting Point, °C. |
|---|---|---|---|---|---|---|
| H | 03,4-dichlorophenyl | H | $CH_3$ | 1 | HBr | [1] 245–246 |
|   | 04-chlorophenyl | H | $CH_3$ | 1 | HBr | [1] 233–234 |
|   | Phenyl | H | $CH_3$ | 1 | HBr | 224–225 |
| Phenyl | do | H | H | 1 | HBr | [1] 236–237 |
| Do | H | H | $CH_3$ | 1 | HBr | 206–208 |

[1] Compound melts with decomposition at indicated temperature.

EXAMPLE 4

1,4,5,6 - tetrahydro - 1,5-dimethyl-as-triazine-3(2H)-thione (13 grams; 0.09 mole) and 1-chloro-2,2-diethoxyethane (14 grams; 0.09 mole) are mixed together in 175 milliliters of ethanol. Ten drops (about 1.5 milliliters) of concentrated hydrochloric acid are added to the mixture and the resulting mixture is heated at the boiling point under reflux for about seventeen hours. The mixture is concentrated by evaporation under reduced pressure to a volume of about 45 milliliters and mixed with an equal volume of cold water. Aqueous sodium hydroxide solution is added to the mixture to provide a pH of about 12 in the ultimate mixture. The aqueous basic mixture is extracted with chloroform and discarded. The chloroform extract is washed once with aqueous sodium chloride, dried over anhydrous magnesium sulfate and distilled in vacuo. The 3,4-dihydro-2,4-dimethyl-2H-thiazolo[2,3-c]-as-triazine product is collected as a fraction boiling at 123°–124° C. under a pressure of 0.1 millimeter of mercury. The structure of the product is confirmed by infrared spectroscopy.

In substantially the same procedure, equimolar proportions of 1 - chloro-2,2-diethoxyethane and 1,4,5,6-tetrahydro - 1 - methyl-as-triazine-3(2H)thione are reacted together in ethanol in the presence of a catalytic amount of hydrochloric acid to prepare 3,4-dihydro-2-methyl-2H-thiazolo[2,3-c]-as-triazine, boiling at 125°–130° C. under a pressure of 0.2 millimeter of mercury.

3,4 - dihydro-6,7-di(4-methylphenyl)-2H-thiazolo[2,3-c]-as-triazine, having a molecular weight of 321, is prepared by reacting together equimolar proportions of 1,4,5,6 - tetrahydro-as-triazine-3(2H)thione and 1-chloro-2,2-dimethoxy-1,2-di(4-methylphenyl)ethane.

EXAMPLE 5

1,4,5,6 - tetrahydro - 1 - methyl-as-triazine-3(2H)-thione (19 grams; 0.14 mole) is mixed with 1-phenyl-1-benzenesulfonyloxy-2-nitriloethane and 400 milliliters of ethanol. The resulting mixture is heated on a steam bath at a temperature of 100° C. for one hour. The reaction mixture is evaporated under reduced pressure and the residue is dissolved in chloroform. The chloroform solution is washed once with aqueous sodium carbonate and a second time with water and the washings are discarded. The washed chloroform solution is dried over anhydrous magnesium sulfate and evaporated under reduced pressure. The residue is purified by chromatography on a column containing 730 grams of alumina (Baker 0537) using a mixture of equal parts of diethyl ether and chloroform as an eluant. The 3,4-dihydro-2-methyl-7-phenyl-2H-thiazolo[2,3-c]-as-triazin-6(7H)one product is recrystallized from a mixture of diethyl ether and pentane and found to melt at a temperature of 95°–97° C. The product is found by analysis to have carbon and hydrogen contents of 58.29 and 5.5 percent, respectively, as compared with the theoretical contents of 58.28 and 5.3 percent, respectively, calculated for the named structure.

In substantially the same procedure, 1,4,5,6-tetrahydro-as-triazine-3(2H)thione (19.2 grams; 0.164 mole) and 1-phenyl-1-(4-toluenesulfonyl)oxy - 2-nitriloethane (47 grams; 0.164 mole) are reacted together in ethanol to obtain 3,4-dihydro-7-phenyl-2H-thiazolo[2,3-c]-as-triazin-6(7H)one, melting at 162°–163.5° C.

EXAMPLE 6

1-chloro-2-nitriloethane (0.3 mole) is mixed together with 1,4,5,6-tetrahydro-1-methyl-as-triazine-3(2H)thione (0.3 mole) and 125 milliliters of ethanol. The mixture is heated at the boiling temperature under reflux for about 22 hours, cooled and evaporated in vacuo to a volume of about 40 milliliters. The mixture is diluted with aqueous sodium carbonate solution to provide a pH of about 9 in the resulting mixture and the basic mixture is extracted with chloroform. The chloroform extract is washed once with aqueous sodium carbonate and once with water, dried over anhydrous magnesium sulfate and evaporated in vacuo. The 3,4-dihydro-2-methyl-2H-thiazolo[2,3-c]-as-triazin-6(7H)one product is recrystallized from methanol and found to melt at 109°–111° C.

In substantially the same procedure, 3,4-dihydro-2-methyl-7-phenyl-2H - thiazolo-[2,3-c] - as-triazin-6(7H) one, melting at 96°–97° C., is prepared by employing 1-bromo-1-phenyl-2-nitriloethane in lieu of the 1-chloro-2-nitriloethane in the above procedure.

EXAMPLE 7

1,4,5,6-tetrahydro 1,5 - dimethyl - as - triazine - 3-(2H) thione (10 grams; 0.07 mole) is mixed with 1-bromo-2-ethoxy-2-ketoethane (12 grams; 0.07 mole) and 150 milliliters of ethanol. The mixture is heated at the boiling temperature under reflux for five hours, evaporated under reduced pressure and the residue mixed with aqueous 10 percent sodium carbonate solution. The basic mixture is extracted with chloroform and the chloroform extract is evaporated to obtain the product as a residue. The residue is purified by chromatography on a column containing 200 grams of alumina (Baker 0537) using a mixture of equal parts of benzene and chloroform as an eluant. The product is recrystallized from a mixture of diethyl ether and pentane to obtain the 3,4-dihydro-2,4-dimethyl-2H - thiazolo[2,3-c] - as-triazin-6(7H)one product as a crystalline solid melting at 76°–77° C.

EXAMPLE 8

1,4,5,6-tetrahydro - 1 - methyl-as-triazine-3(2H)-thione (41 grams; 0.31 mole) is mixed together with 1-bromo-2-ethoxy-2-ketoethane (52 grams; 0.31 mole) and 100 milliliters of ethanol. The reaction mixture is heated at the boiling temperature under reflux for eighteen hours and allowed to cool to room temperature, whereupon a crystalline solid precipitates from the mixture. The precipitate is separated by decantation and recrystallized from methanol to obtain the 3,4-dihydro-2-methyl-2H-thiazolo[2,3-c]-as-triazin-6(7H)one hydrobromide product as a crystalline solid melting at 163°–165° C. The product is treated with aqueous 10 percent sodium carbonate solution and the basic mixture is extracted with chloroform. The chloroform extract is evaporated and the residue is recrystallized from methanol to obtain the free base 3,4-dihydro-2-methyl-2H-thiazolo[2,3-c]-as-triazin-6(7H)one product, melting at 109°–111° C.

In substantially the same procedure, 3,4-dihydro-2H-thiazolo[2,3-c]-as-triazin-6(7H)one hydrobromide, melting at 208°–209° C. with decomposition, and the free base 3,4-dihydro-2H-thiazolo[2,3-c]-as-triazin-6(7H)one, melting at 112°–115° C., are prepared by substituting 1,4,5,6-tetrahydro-as-triazine-3(2H)thione for the 1,4,5,6-tetrahydro-1-methyl-as - triazine-3(2H)thione in the above procedure.

EXAMPLE 9

3,4-dihydro-2-methyl-2H-thiazolo[2,3-c] - as - triazin-6(7H)one (0.064 mole) is mixed together with 2,4-dichlorobenzadelhyde (0.064 mole), 2 milliliters of piperidine and 100 milliliters of ethanol. The mixture is heated at the boiling temperature under reflux for four hours and held for eighteen hours thereafter at ambient temperatures, during which time a solid precipitate forms in the reaction mixture. The product is collected as a filter cake by filtration of the reaction mixture. The 3,4-dihydro-2-methyl - 7-(2,4 - dichlorobenzylidene)-2H-thiazolo[2,3-c]-as-triazin-6(7H)one product is recrystallized from isopropanol and found to melt at 190°–192° C. The product is found by analysis to have carbon, hydrogen and chlorine contents of 47.5, 3.5 and 21.4 percent, respectively, as compared with the values of 47.6, 3.4 and 21.6 percent, respectively, calculated for the named structure.

In substantially the same procedure, 3,4-dihydro-2-methyl-7-[4-(2-aminoethylamino)benzylidene] - 2H-thiazolo[2,3-c]-as-triazin-6(7H)one, having a molecular weight of 317, is prepared by substituting 4-(2-aminoethylamino)benzaldehyde for the 2,4-dichlorobenzaldehyde employed in the above procedure.

EXAMPLE 10

3,4-dihydro - 2H - thiazolo[2,3-c]-as-triazin-6(7H)one (10 grams; 0.59 mole) is mixed with 3,4,5-trimethoxybenzaldehyde (11.5 grams; 0.059 mole), 3 milliliters of piperidine and 100 milliliters of ethanol. The mixture is heated at the boiling temperature under reflux for three hours and allowed to cool to room temperature, during which time a solid precipitate forms in the reaction mixture. The reaction mixture is filtered and the filter cake is dissolved in 80 milliliters of hot chloroform. The chloroform mixture is filtered and diluted with 150 milliliters of ether. On cooling, two crystalline components separate from the mixture. The two components are separated by fractional crystallization and separately purified by recrystallization to obtain 3,4-dihydro-2-methyl-7-(3,4,5-trimethoxybenzylidene)-2H-thiazolo[2,3-c]-as-triazin-6(7H)one as a yellow crystalline solid melting at 187°–188.5° C., and 3,4-dihydro-2-methyl-7-(α-hydroxy-3,4,5-trimethoxybenzyl) - 2H - thiazolo[2,3-c]-as-triazin-6(7H) one as a white crystalline solid melting at 198°–199° C.

EXAMPLE 11

In substantially the same procedure as employed in the preceding Examples 9 and 10, a series of thiazolotriazine compounds corresponding to Formula IIb are prepared by the reaction of an aldehyde with a substituted 3,4-dihydro-2H-thiazolo[2,3-c]-as-triazin - 6(7H)one. Representative compounds identified by the substituents R', R'', $R_2$ and $R_3$ are set out in the following table, together with their melting points. In each case, $n$ equals zero.

| R' and R'' | $R_2$ | $R_3$ | Melting point, °C. |
| --- | --- | --- | --- |
| Benzylidene | H | $CH_3$ | 136–137 |
| 2-chloro-4-dimethylaminobenzylidene | H | $CH_3$ | 176–178 |
| 3,4-dichlorobenzylidene | H | $CH_3$ | 191–192 |
| 3,4-dichloro-α-hydroxybenzyl (R'' is H) | H | $CH_3$ | 163–164 |
| 3,4-dimethoxybenzylidene | H | $CH_3$ | 157–158 |
| Indol-3-ylmethylene | H | $CH_3$ | [1] 285–287 |

[1] Compound melts with decomposition at indicated temperature.

EXAMPLE 12

1,4,5,6 - tetrahydro - 1,5 - dimethyl-as-triazine - 3(2H) thione (23.2 grams; 0.15 mole) is mixed with 400 milliliters of methanol and the mixture is heated to the boiling temperature under reflux with stirring. Over a period of four hours, a solution of 1,2-dibromoethane (28.1 grams; 0.15 mole) in 200 milliliters of methanol is added dropwise to the stirred mixture. After the addition is complete, the mixture is stirred and heated at the boiling temperature for an additional three hours, cooled to room temperature, mixed with 42 grams (0.3 mole) of potassium carbonate and heated at the boiling temperature under reflux for an additional two hours. The mixture is filtered and the filtrate is evaporated under reduced pressure. The residue is chromatographed on a column containing 300 grams of alumina (Baker 0537) using chloroform as an eluant. The first material coming off the column is identified as 3,3'-(ethylenedithio)bis(1,4,5,6-tetrahydro-1,5-dimethyl-as-triazine). The 2,3,6,7-tetrahydro-5,7-dimethyl-5H-thiazolo[3,2-b]-as-triazine product is collected after the first material has come off the column. The product is dissolved in a mixture of methanol and diethyl ether and the solution is saturated with gaseous hydrogen bromide until precipitation of the product is complete. The 2,3,6,7-tetrahydro-5,7-dimethyl-5H-thiazolo[3,2-b]-as-triazine hydrobromide product is found to melt at 113°–114° C.

EXAMPLE 13

1,4,5,6 - tetrahydro-1-methyl-as-triazine - 3(2H)thione (26 grams; 0.02 mole) is mixed together with 22 grams (0.2 mole) of sodium carbonate and 750 milliliters of methanol and the resulting mixture is stirred and heated at the boiling temperature under reflux. Over a period of ten minutes, a solution of 1,2-dibromoethane (38 grams; 0.2 mole) in 250 milliliters of methanol is added to the mixture and the resulting mixture is stirred and heated at the boiling temperature under reflux for 88 hours. The mixture is evaporated under reduced pressure and the residue is dissolved in a mixture of 500 milliliters of chloroform and 200 milliliters of water. The chloroform layer is separated, washed with water, dried and evaporated under reduced pressure. The residue is distilled under reduced pressure and the 2,3,6,7-tetrahydro-5-methyl-5H-thiazolo [3,2-b]-as-triazine product is collected as a fraction boiling at 142°–144° C. under a pressure of 1.7–2.5 millimeters of mercury. The product is dissolved in a mixture of 70 milliliters of ether and 5 milliliters of isopropanol and the solution is saturated with gaseous hydrogen bromide until precipitation ceases. The 2,3,6,7-tetrahydro-5-methyl - 5H - thiazolo[3,2-b]-as-triazine hydrobromide product is separated by filtration, recrystallized from a mixture of methanol and ether and found to melt at a temperature of 204°–205° C.

EXAMPLE 14

1,4,5,6-tetrahydro-1-methyl-as-triazine - 3(2H) - thione (0.2 mole) and 1-bromo-2-hydroxyethane (0.2 mole) are mixed together in 700 milliliters of ethanol and the mixture is heated at the boiling temperature under reflux for about six hours. The mixture is evaporated under reduced pressure and the residue is extracted with chloroform. The chloroform extract is washed with water and evaporated to obtain 1,4,5,6-tetrahydro-3-(2-hydroxyethylthio)-1-methyl-as-triazine. The 1,4,5,6-tetrahydro-3-(2-hydroxyethylthio-1-methyl-as-triazine is treated with excess thionyl chloride, the excess unreacted thionyl chloride is removed by evaporation under reduced pressure and the mixture is treated with excess aqueous sodium carbonate solution. The mixture is extracted with chloroform and the chloroform extract is evaporated to obtain 2,3,6,7-tetrahydro-5-methyl-5H-thiazolo[3,2-b]-as-triazine which is treated with hydrogen bromide in the procedure employed in Example 13 to prepare the product as the hydrobromide salt. The 2,3,6,7-tetrahydro-5-methyl-5H-thiazolo[3,2-b]-as-triazine hydrobromide product is found to melt at 204°–205° C. Elemental analysis and infrared spectroscopy confirm the structure of the product.

In a similar procedure, equimolar proportions of 1-bromo-2-(p-toluenesulfonyl)oxyethane and 1,4,5,6-tetrahydro-1,5-dimethyl-as-triazine-3(2H)thione are reacted together in refluxing ethanol and the product treated with hydrogen bromide to obtain 2,3,6,7-tetrahydro-5,7-dimethyl - 5H - thiazolo[3,2-b]-as-triazine hydrobromide, melting at 113°–114° C.

EXAMPLE 15

1,4,5,6 - tetrahydro-4-(2-hydroxyethyl)-1-methyl-as-triazine-3(2H)thione (44 grams; 0.25 mole) is dissolved in 125 milliliters of dimethylformamide and added dropwise to 290 grams of thionyl chloride maintained at a temperature of about 25° C. The reaction mixture is held at ambient temperatures for thirty minutes after the addition is complete and then mixed with 1.5 liters of ether. The ether mixture separates on standing and the ether layer is removed by decantation. The residue is evaporated under reduced pressure and the evaporation residue is slowly mixed with a mixture of crushed ice and excess solid sodium carbonate. The resulting mixture is extracted with chloroform and the chloroform extract is dried over magnesium sulfate and concentrated by evaporation in vacuo. The residue is mixed with tetrachloroethylene and evaporated at a temperature of 60° C. under reduced pressure. The residue is distilled under reduced pressure and the 3,4,6,7 - tetrahydro-2-methyl-2H-thiazolo-[2,3-c]-as-triazine product is collected as a fraction boiling at 152° C. under a pressure of 0.4 millimeter of mercury. The product solidifies on cooling and the solid product is found to melt at 50.5°–51.5° C. The product is dissolved in ether and hydrogen bromide gas is added to the ether solution until precipitation is complete. The precipitate is separated and recrystallized three times from a mixture of methanol and ether to obtain the 3,4,6,7-tetrahydro-2-methyl-2H-thiazolo[2,3-c]-as-triazine hydrobromide as a crystalline solid melting at 141°–142° C. The product is found by elemental analysis to have bromine and nitrogen contents of 33.44 and 17.61 percent, respectively, as compared with the values of 33.55 and 17.64 percent, respectively. A second portion of the free base product is treated with hydrogen chloride in ether solution to obtain the product as the hydrochloride salt having a molecular weight of 194.

In substantially the same procedure, 1,4,5,6-tetrahydro-4-(2-hydroxy-1-phenylethyl)-1-methyl-as-triazine - 3(2H) thione is reacted successively with thionyl chloride and a hydrogen halide acceptor to obtain 3,4,6,7-tetrahydro-2 - methyl-6-phenyl-2H-thiazolo-[2,3-c]-as-triazine, melting at 83°–84° C.

In substantially the same procedure, 1,4,5,6-tetrahydro-1 - propyl-4-[2-hydroxy(4-dimethylaminophenyl)-ethyl]-as-triazine-3(2H)-thione is treated successively with thionyl bromide and a hydrogen halide acceptor to obtain 3,4,6,7 - tetrahydro-2-propyl-6-(4-dimethylaminophenyl)-2H-thiazolo[2,3-c]-as-triazine, having a molecular weight of 331. The product is dissolved in ether and treated with maleic acid to obtain the product as the maleate salt, having a molecular weight of 447.

EXAMPLE 16

1,4,5,6 - tetrahydro-1-methyl-4-(2,2-diethoxyethyl)-as-triazine-3(2H)-thione (15 grams) is mixed with 75 milliliters of concentrated sulfuric acid. The reaction mixture is heated on a steam bath for one hour and then allowed to cool to ambient temperature, after which it is diluted with ice water, neutralized by the addition of aqueous sodium carbonate and extracted with chloroform. The chloroform extract is evaporated in vacuo and the residue distilled in vacuo to obtain the 3,4-dihydro-2-methyl-2H-thiazolo[2,3-c]-as-triazine product as an oil boiling at 125°–130° C. under a pressure of 0.2 millimeter of mercury.

EXAMPLE 17

Three grams of 3,4,6,7-tetrahydro-2-methyl-2H-thiazolo[2,3-c]-as-triazine are dissolved in 20 milliliters of ether. Three grams of methyl iodide are dissolved in 10 milliliters of ether and added dropwise to the solution of the thiazolotriazine. The reaction mixture is stirred well and allowed to stand for about two weeks at a temperature of about 5° C., during which time a precipitate forms. The precipitate is separated by filtration and recrystallized from methanol. The 3,4,6,7-tetrahydro-2-methyl-2H-thiazolo[2,3-c]-as-triazine methoiodide product is found to melt at a temperature of 230.5°–232° C. The structure of the product is confirmed by elemental analysis and by infrared and nuclear magnetic resonance spectrosopy.

In substantially the same procedure, 3,4,6,7-tetrahydro-4'-methyl-2H-thiazolo[2,3 - c]-as-triazine methobromide, having a molecular weight of 252, is prepared by the reaction of the corresponding free base thiazolotriazine with methyl bromide.

In substantially the same procedure, 3 grams of methyl iodide are reacted with 3 grams of 2,3,6,7-tetrahydro-5-methyl-5H-thiazolo[3,2-b]-as-triazine and the product is separated and recrystallized once from a mixture of isopropanol and ether and once from isopropanol to obtain the 2,3,6,7 - tetrahydro - 5 - methyl-5H-thiazolo[3,2-b]-astriazine methoiodide product as a crystalline solid melting at 153°–154.5° C. The structure of the product is confirmed by elemental analysis and infrared and nuclear magnetic resonance spectroscopy.

In a procedure similar to that employed above, an ether solution of 3,4-dihydro-2,4-dimethyl-6-(2-chloro-4-methylaminobenzylidene) - 2H - thiazolo[2,3-c] - as - triazin-6(7H)one is treated with sulfuric acid. The 3,4-dihydro-2,4-dimethyl-6-(2-chloro - 4 - methylaminobenzylidene)-2H-thiazolo[2,3-c]-as-triazin-6(7H)one sulfate product, having a molecular weight of 435, is obtained as a solid precipitate. Similarly, 3,4-dihydro-6,7-diphenyl-2-methyl-2H-thiazolo[2,3-c]-as-triazine is dissolved in ether and treated with excess acetic acid to precipitate 3,4-dihydro-6,7-diphenyl - 2 - methyl-2H-thiazolo[2,3-c]-as-triazine acetate, having a molecular weight of 371, as a crystalline solid product.

The compounds of the invention can be administered to animals in the study of the behavior thereof and in the study of drug effects on the central and peripheral nervous systems thereof. The compounds are typically administered to animals at antidepressant dosages of from about 10 milligrams or less per kilogram of animal body weight to as high as about 300 milligrams or more per kilogram of animal body weight, depending upon the particular compound, methobromide, methoiodide or pharmaceutically-acceptable salt thereof employed, and upon such factors as age, species, size and physical condition of the animal, route of administration and the effect to be produced. The compounds are preferably administered as compositions comprising one or more compounds of the invention and one or more pharmaceutical excipients including inert diluents, dispersing agents, binders, lubricants, wetting agents and the like. The thiazolotriazines can be administered orally in the form of tablets, capsules, elixirs, syrups, emulsions, dispersible powders and the like, or by injection in the form of sterile injectable suspensions or solutions.

The compounds of the invention are useful as antidepressants as indicated by their potentiation of the hyper-excitement, hyperirritability and fighting resulting from administration of amphetamine to rodents and by their antagonism of reserpine. They are also useful for potentiating the effects of barbiturates.

Antidepressant activity of the new compounds is indicated by antagonism of reserpine-induced depression in mice. In representative operations, separate thiazolotriazines are administered to separate groups of mice at various dosage rates by intraperitoneal injection. The mice are observed for thirty minutes following administration of the test compounds and their behavior appears normal. Thirty minutes after the dose of the thiazolotriazine, reserpine is administered to each mouse by intraperitoneal injection at a dosage rate of 5 milligrams per kilogram. The administration of 5 milligrams per kilogram of reserpine intraperitoneally to untreated mice results in a progression of signs starting with drooping of the eyelids (ptosis) and piloerection and culminating in a generalized depression with decreased spontaneous motor activity and decreased responsiveness to auditory or tactile stimuli.

Following the administration of the reserpine, the test animals are observed for the above signs of depression. Antagonism of reserpine-induced depression is indicated when no ptosis is observed and the mice are observed to exhibit normal spontaneous motor activity and normal responsiveness to stimuli. The dosage of representative thiazolotriazine compounds effective to antagonize reserpine-induced depression in 50 percent of the mice (ED 50) is calculated. 3,4-dihydro-2-methyl-7-phenyl-2H-thiazolo[2,3-c]-as-triazin-6(7H)one is found to have an ED 50 of 61 milligrams per kilogram. 3,4-dihydro-2-methyl-7-phenyl-2H-thiazolo[2,3-c]-as-triazine hydrobromide and 3,4-dihydro-2-methyl-6-(4-chlorophenyl) - 2H - thiazolo-[2,3-c]-as-triazine hydrobromide are found to have ED 50's of 33 and 39 milligrams per kilogram, respectively.

In other operations, representative compounds of the invention are found to potentiate the symptoms of hyper-excitement and hyperirritability induced in mice by administration of amphetamine. In these operations, groups of ten mice are administered a test compound by intraperitoneal injection at various dosage rates. Thirty minutes later, the mice are administered 5 milligrams per kilogram of d-amphetamine sulfate by intraperitoneal injection. Each group of ten mice is then placed in a wire mesh cage measuring 16 centimeters on a side. The intraperitoneal injection of 20 milligrams per kilogram of amphetamine to mice, followed by aggregation of the mice in small cages results in hyperexcitement, fighting and death of all the mice within about five hours. The administration of 5 milligrams of amphetamine per kilogram is not generally fatal to any of the mice under the described conditions. The dosage of representative thiazolotriazines required to produce death in 50 percent of the amphetamine-treated mice (ED 50) is calculated, and 2,3,6,7-tetrahydro-5-methyl - 5H - thiazolo[3,2-b]-as-triazine hydrobromide, 3,4-dihydro - 6,7 - diphenyl-2-methyl-2H-thiazolo[2,3-c]-as-triazine hydrobromide and 3,4-dihydro-7-(3,4-dimethoxybenzylidene) - 2 - methyl - 2H - thiazolo[2,3-c]-as-triazin-6(7H)one are found to potentiate amphetamine with ED 50's of 23, 92 and 7 milligrams per kilogram, respectively. In identical operations, 3,4-dihydro-2-methyl-6-phenyl-2H-thiazolo[2,3-c]-as-triazine,
3,4-dihydro-2H-thiazolo[2,3-c]-as-triazin-6(7H)one hydrobromide,
3,4-dihydro-7-(2-chloro-4-dimethylaminobenzylidene)-2-methyl-2H-thiazolo[2,3-c]-as-triazin-6(7H)one and
3,4-dihydro-7-(2,4-dichlorobenzylidene)-2-methyl-2H-thiazolo[2,3-c]-as-triazin-6(7H)one are found to potentiate amphetamine at ED 50's of 0.9, 82, 19.5 and 24 milligrams per kilogram, respectively.

The thiazolotriazine compounds also exhibit central nervous system activity as indicated by their effectiveness in prolonging hexobarbital sleep time. In these determinations, mice are administered a representative thiazolotriazine by intraperitoneal injection. Thirty minutes after the administration of the thiazolotriazine compound, the mice are administered hexobarbital at a dosage rate of 100 milligrams per kilogram by intraperitoneal injection. Untreated control mice are similarly injected with hexobarbital at a dosage rate of 100 milligrams per kilogram to serve as checks. The hexobarbital injections induce sleep in the mice. All the animals are then placed on their backs and the period of time until each mouse spontaneously turns over and rights itself is recorded as sleep time. The ratio of average sleep time for the treated mice to that for the untreated mice is expressed as hexobarbital sleep time ratio. In representative operations, hexobarbital sleep time ratios of about three are observed when one of 3,4-dihydro-7-(3,4-dichloro-α-hydroxybenzyl)-2-methyl-2H-thiazolo[2,3-c]-as-triazin-6(7H)one,
3,4-dihydro-7-benzylidene-2-methyl-2H-thiazolo[2,3-c]-as-triazin-6(7H)one or
3,4-dihydro-2,4-dimethyl-6-phenyl-2H-thiazolo[2,3-c]-as-triazine hydrobromide is administered to mice at dosage rates of 227, 275 and 72 milligrams per kilogram, respectively.

What is claimed is:
1. A compound corresponding to one of the formulae

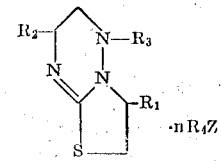

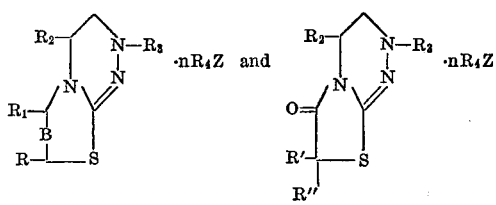

wherein B represents a double bond or a single bond, R and $R_1$ each independently represent hydrogen, indolylmethyl, phenyl, benzyl, substituted phenyl, substituted benzyl, methyl, ethyl, propyl or butyl; R' represents R, indolylhydroxymethyl, α-hydroxybenzyl or α-hydroxy-substituted-benzyl; R'' represents hydrogen or R' and R'', taken together, represent indolylmethylene, benzylidene or substituted benzylidene; $R_2$ and $R_3$ each independently represent hydrogen, methyl, ethyl or propyl; $n$ represents one of the integers zero or one and $R_4Z$ represents methobromide, methoiodide or the acid moiety of a pharmaceutically-acceptable acid addition salt; and in which substituted phenyl, substituted benzyl and substituted benzylidene are selected from phenyl, benzyl and benzylidene, respectively, substituted with from one to three substituents selected from fluorine, chlorine, bromine and loweralkyl and loweralkoxy of from one to three carbon atoms or a single substituent selected from amino, aminoloweralkylamino, loweralkylamino and diloweralkylamino in which loweralkyl is of from 1 to 3 carbon atoms.

2. A compound of claim 1 wherein the compound is a thiazolo[2,3-c]triazine.

3. A compound of claim 2 wherein $R_2$ and $R_3$ each independently represent hydrogen or methyl, B represents a double bond and substituted phenyl, substituted benzyl and substituted benzylidene are selected from the group consisting of phenyl, benzyl and benzylidene substituted with from 1 to 3, inclusive, substituents selected from chlorine, bromine and methoxy.

4. A compound of claim 2 wherein $R_2$ is hydrogen, $R_3$ is hydrogen or methyl and $R_4Z$ is hydrogen halide.

5. A compound of claim 1 wherein R is hydrogen.

6. A method useful for the preparation of a 5H-thiazolo[3,2-b]-as-triazine compound, the method comprising reacting a compound of the formula

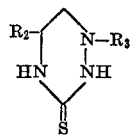

wherein $R_2$ and $R_3$ each independently represent hydrogen, methyl, ethyl or propyl with a 1,2-disubstituted ethane corresponding to the formula:

$$\begin{array}{c} CH_2-OH \\ | \\ R-CH-X \end{array}$$

wherein R represents hydrogen, indolylmethyl, phenyl, benzyl, substituted phenyl, substituted benzyl, methyl, ethyl, propyl or butyl; X independently represents chlorine, bromine or iodine in each occurrence thereof, and in which substituted phenyl and substituted benzyl are selected from phenyl and benzyl, respectively, substituted with from one to three substituents selected from fluorine, chlorine, bromine and loweralkyl and loweralkoxy of from one to three carbon atoms or a single substituent selected from amino, aminoloweralkylamino, loweralkylamino and diloweralkylamino in which loweralkyl is of from one to three carbon atoms; to obtain a substituted 1,4,5,6-tetrahydro-3-(2-hydroxyethylthio)-as-triazine compound corresponding to the formula

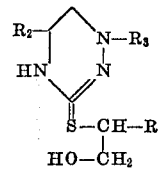

reacting the resulting 1,4,5,6-tetrahydro-3-(2-hydroxyethylthio)-as-triazine with a thionyl halide selected from the group consisting of thionyl chloride and thionyl bromide to obtain the corresponding 1,4,5,6-tetrahydro-3-(2-haloethylthio)-as-triazine; and contacting the resulting 1,4,5,6-tetrahydro-3-(2-haloethylthio)-as-triazine with excess hydrogen halide acceptor in the presence of an inert solvent.

References Cited

UNITED STATES PATENTS 3,428,635   2/1969   Trepanier et al. _____ 260—248

OTHER REFERENCES

Trepanier et al., J. Med. Chem., vol. 10, pp. 228–31 (1957) RS 1 J5.

Doleschall et al., Acta Chim. Acad. Sci. Hung., vol. 53, pp. 385–96 (1967).

JOHN M. FORD, Primary Examiner

U.S. Cl. X.R.

260—240 F; 424—249

UNITED STATES PATENT OFFICE
CERTIFICATE OF CORRECTION

Patent No. 3,641,019     Dated 8 Feb. 1972

Inventor(s) Donald L. Trepanier and Paul E. Krieger

It is certified that error appears in the above-identified patent and that said Letters Patent are hereby corrected as shown below:

Column 1, line 18, change "1-nitriol-" to -- 1-nitrilo- --.

Column 1, change the two formulae at lines 55 and 60 around, as follows:

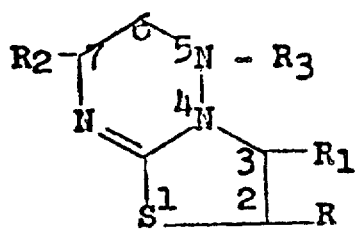   · $nR_4Z$     I

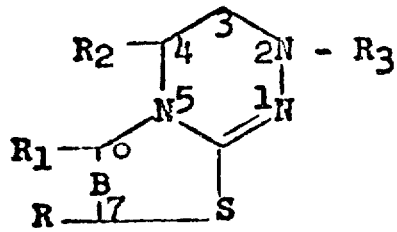   · $nR_4Z$     IIa

Column 6, line 59, delete "of" and insert --for--.

Column 13, table at line 70, in the first line under $R_1$ delete "03,4-dichlorophenyl" and insert --3,4-dichlorophenyl--; in the second line under $R_1$ delete "04-chlorophenyl" and insert --4-chlorophenyl--.

Column 17, line 39, insert a paranthesis so that it reads: --droxyethylthio)-1-methyl-as-triazine--.

Column 20, formula at lines 70-75, add --R-- so that it reads:

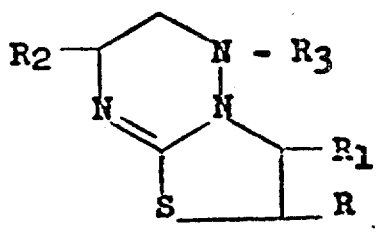   · $nR_4Z$     ;

Signed and sealed this 19th day of September 1972.

(SEAL)
Attest:

EDWARD M. FLETCHER, JR.         ROBERT GOTTSCHALK
Attesting Officer              Commissioner of Patents